Patented Jan. 27, 1953

2,626,909

UNITED STATES PATENT OFFICE 2,626,909

PROCESS FOR BREAKING PETROLEUM EMULSIONS

Melvin De Groote, University City, Mo., assignor to Petrolite Corporation, a corporation of Delaware No Drawing. Application May 14, 1951, Serial No. 226,324

11 Claims. (Cl. 252—340)

This invention relates to processes or procedures particularly adapted for preventing, breaking or resolving emulsions of the water-in-oil type, and particularly petroleum emulsions.

Complementary to the above aspect of the invention herein disclosed is my companion invention concerned with the new chemical products or compounds used as the demulsifying agents in said aforementioned processes or procedures, as well as the application of such chemical compounds, products or the like, in various other arts and industries, along with the method for manufacturing said new chemical products or compounds which are of outstanding value in demulsification. See my co-pending application, Serial No. 226,325, filed May 14, 1951.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

Briefly stated, the present invention is concerned with a process for breaking petroleum emulsions characterized by subjecting the emulsion to the action of a demulsifier which includes a hydrophile synthetic product which is an acidic fractional ester of a polycarboxy acid with oxypropylated allyl starch or oxypropylated polymerized allyl starch, the allyl starch or polymerized allyl starch being oxypropylated with 5 to 50 parts by weight of propylene oxide per unit weight of the allyl starch or polymerized allyl starch. In forming the esters, the polycarboxy acid and the oxypropylated allyl starch or polymerized allyl starch are used in proportions of one mole of the acid for each hydroxyl radical present in the allyl starch or polymerized allyl starch.

For purpose of convenience, what is said hereinafter will be divided into five parts:

Part 1 will be concerned with a brief description of allyl starch and polymerized allyl starch;

Part 2 will be concerned with the oxypropylation of allyl starch and polymerized allyl starch;

Part 3 will be concerned with the preparation of the esters from the oxpropylated derivatives;

Part 4 will be concerned with the use of oxypropylated derivatives of the kind referred to previously as demulsifiers for petroleum emulsions of the water-in-oil type, and Part 5 will be concerned with derivatives valuable for various purposes including demulsification but not specifically claimed in the instant application.

PART 1

Allyl starch is the name commonly applied to the allyl ether of starch. Allyl ethers of starch are well known and have been described in the literature. See the article entiled "Allyl Ether of Starch. Preparation and Industrial Possibilities." by Nichols, Jr., Hamilton, Smith, and Yanovsky. (Industrial & Engineering Chemistry, volume 37, No. 2, February 1945, page 201.) Allyl starch is available commercially.

The number of allyl groups introduced per glucose unit vary somewhat but on the average, probably 2.5 allyl groups per glucose unit is high. In the manufacture of allyl starch the product can be purified by dissolving in acetone, filtering off the small amount of unchanged or lowly substituted starch and precipitating with water. Allyl starches, as one would suspect, are readily soluble in semi-polar or oxygenated solvents such as the alcohols, dipropyleneglycol, ketones, ether alcohols, ester alcohols, etc., and particularly in the nonoxygenated or nonhydroxylated compounds if a small amount of isobutanol is added. They are also generally soluble in all halogenated compounds except carbontetrachloride; for instance, one can usually dissolve 2 grams of allyl starch in 20 grams of suitable solvent without any difficulty. This is true in regard to benzene. For convenience, the allyl starches employed are referred to as organic solvent-soluble allyl starches or as water-insoluble allyl starches.

The manufacturer of commercially available allyl starch states as follows:

"Allyl starch is soluble in alcohols, ketones, esters, halogenated hydrocarbons, nitroparaffins, ethers, glycols (in some instances the addition of small amounts of Butyl Cellosolve or butanol is required to provide good solubility), and in aromatic hydrocarbons provided some hydrogenbond forming solvent such as isobutanol is present. It is insoluble in aliphatic hydrocarbons and turpentine."

Commercial use of allyl starch is largely in the field of coatings or similar materials, such as bronzing liquids, thermosetting adhesives, overprint and finishing varnish, printing ink vehicles, and the like. In numerous instances the industrial application depends upon the ease with which allyl starch polymerizes. This fact has been noted in the literature as, for example, in the article previously cited. This allyl ether of starch insolubilizes with greater ease than the comparatively easier oxidizable allyl ethers of simpler carbohydrates.

Indeed, the manufacturer of commercial allyl starch states as follows:

"*Solution stability.*—Once allyl starch is dissolved in a solvent it is protected from air and the solutions may be stored for indefinite periods without danger of gelation. Solutions containing driers may also be stored, provided the container is kept filled in order to displace air."

In other words the solution of allyl starch oxidizes readily by mere exposure to air in the presence or absence of a catalyst. In the absence of a catalyst polymerization takes place by simply blowing in the manner, for example, that castor oil is blown at 100° C. or somewhat higher. At a lower temperature polymerization takes place if one blows in presence of 0.05% of cobalt (based on the weight of solids) and in the form of cobalt octoate or cobalt naphthenate. In any event one may prepare any suitable solution of the water-insoluble allyl starch, subject the same to blowing with air at a comparatively low temperature in presence of a catalyst as mentioned, and stop the blowing at a stage short of gelation and thus have a solution of polymerized allyl starch rather than allyl starch. As far as oxypropylation is concerned, as hereinafter described it is immaterial whether one uses allyl starch or polymerized allyl starch. In either event the allyl starches must be water-insoluble and organic solvent-soluble. It goes without saying it is more convenient if the organic solvent is one which does not interfere with subsequent oxypropylation. All of this as far as suitbale solutions are concerned, will be illustrated by subsequent examples.

*Preparation of allyl starch solution*

Allyl starch was obtained as a solid which is stored and shipped under water. Solids can also be isolated from the 40% solution which is normally sold. The water was drained from the solid material and the powder immersed in a mixture of diphenyl ether and xylene. The mass was heated under reflux condenser with a phase-separating trap and water eliminated in the usual manner, along with xylene. When the water was completely eliminated and part of the xylene removed the final product consists of 8.5 parts of allyl starch and 13 parts of solvent. The 13 parts of solvent represented 27% of diphenyl ether and 73% xylene. Any other suitable solvent could be used just as satisfactorily.

PART 2

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature-low reaction rate oxypropylations have been described very completely in U. S. Patent No. 2,448,664, to H. R. Fife, et al., dated September 7, 1948. Low temperature, low pressure oxypropylations are particularly desirable where the compound being subjected to oxypropylation contains one, two or three points of reaction only, such as monohydric alcohols, glycols and triols.

Since low pressure-low temperature low-reaction speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features; (*a*) a solenoid controlled valve which shuts off the propylene oxide in event that the temperature gets outside a predetermined and set range, for instance, 95° to 120° C., and (*b*) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gage, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer, connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C.

Numerous reactions were conducted in which the time varied from one day to two days for completion of the final series. In some instances the reaction took place in considerably less time; for instance, at a single stage the reaction may have been complete in 5, 6 or 7 hours. In the series employed for purpose of illustration subsequently, the minimum period of time was 6 hours and the maximum 8 hours. Actually, where an oxypropylation is indicated as being complete in 6 hours it may have been complete in a considerably shorter period of time in light of the automatic equipment employed. This applies, also, to other periods of reaction, for instance, longer or shorter. The automatic devices continue stirring for the predetermined period of time even though reaction may have been complete earlier. In the addition of propylene oxide, in the autoclave equipment as far as possible the valves were set so all the propylene oxide if fed continuously would be added at a rate so that the predetermined amount would react within the first 15 hours of the 24-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 10-hour period there would be an unquestionable speeding up of the reaction, by simply repeating the examples and using 3, 4, or 5 hours instead of 10 hours.

When operating at a comparatively high temperature, for instance, between 150° to 200° C., an unreacted alkylene oxide such as propylene oxide, makes its presence felt in the increase in pressure or the consistency of a higher pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may elapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gauges, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specifically designed for the purpose.

Example 1a

The starting material was a mixture of allyl starch and solvent as previously described. More specifically, the mixture consisted of 8.5 pounds of allyl starch of a commercial grade, 3.5 pounds of diphenyl ether, and 9.5 pounds of xylene. The particular autoclave employed was one with a capacity of about 15 gallons, or on the average of about 125 pounds of the reaction mass. The initial charge was as previously indicated, and including one pound of caustic soda. The reaction pot was flushed out with nitrogen, the autoclave sealed, and the automatic devices adjusted for injecting 43.75 pounds of propylene oxide in approximately a 6-hour period. The oxide was added at the rate of about 9 or 10 pounds per hour. The pressure regulator was set for a maximum of 15 to 20 pounds per square inch. In other similar experiments I have used a somewhat higher pressure, for instance, a maximum pressure of 35 to 37 pounds per square inch. However, in this particular instance the pressure did not actually reach a maximum of over 20 pounds per square inch. I have found no difficulty in conducting this reaction under conditions as described at this comparatively low pressure. The temperature employed was 250–260° F.

The conditions as far as temperature and pressure were concerned are identical in the three subsequent examples, to wit, in Examples 2a, 3a and 4a.

It may be well to point out that the comparatively low pressure was due to the fact, in part at least, that there was a sizeable concentration of catalyst in all four stages of oxypropylation.

The rate of addition of propylene oxide as above indicated was comparatively slow. The initial introduction of propylene oxide was not started until the heating devices had raised the temperature well above the boiling point of water, for instance, to about 240° F. At the completion of the reaction a sample was taken and oxypropylation proceeded as in Example 2a, immediately following.

Example 2a 57.75 pounds of the reaction mass identified as Example 1a, preceding, and equivalent to 7.4 pounds of allyl starch, 38.2 pounds of propylene oxide, .85 pound of caustic soda, and 11.3 pounds of solvent were subjected to further oxypropylation without the addition of any more catalyst, in the same manner as described in Example 1a, preceding.

The amount of oxide added was 42.75 pounds. The time of addition was 7 hours. The rate of addition was about 6 or 7 pounds per hour. At the end of the reaction period part of the reaction mass was withdrawn and the remainder subjected to further oxypropylation as described in Example 3a, immediately following.

Example 3a 62.75 pounds of reaction mass identified as Example 2a, preceding, and equivalent to 4.62 pounds of allyl starch, 50.55 pounds of propylene oxide, .53 pound of caustic soda, and 7.05 pounds of solvent, were subjected to further oxypropylation without the addition of any more catalyst in the same manner as employed in Example 1a and 2a, preceding. The amount of oxide added was 44.25 pounds. The time required to add the oxide was 8 hours. The oxide was added at the rate of about 6 pounds per hour. At the end of the reaction period part of the reaction mass was withdrawn and the remainder subjected to further oxypropylation in the manner described in Example 4a, following.

Example 4a 61.75 pounds of the reaction mass identified as Example 3a, preceding, were subjected to further oxypropylation without the addition of any more catalyst, following the same procedure as noted in Examples 1a through 3a, preceding. The amount of oxide added was 21.05 pounds; the oxide was added in 7¾ hours. The rate was about 3½ pounds per hour. The procedure as far as oxypropylation was concerned was the same as in preceding examples.

What has been said herein is presented in tabular form in Table 1 immediately following, with some added information as to molecular weight and as to solubility of the reaction product in water, xylene, and kerosene.

TABLE 1

| Ex. No. | Composition Before | | | | | Composition at End | | | | M. W. by Hyd. Determin. | Max. Temp., °F. | Max. Pres., lbs. sq. in. | Time, hrs. |
|---|---|---|---|---|---|---|---|---|---|---|---|---|---|
| | H. C. Amt., lbs. | Oxide Amt., lbs. | Catalyst, lbs. | Solvent Amt., lbs. | Theo. Mol. Wt. | H. C. Amt., lbs. | Oxide Amt., lbs. | Catalyst, lbs. | Solvent Amt., lbs. | | | | |
| 1a | 8.50 | -------- | 1.0 | 13.0 | 1,240 | 8.50 | 43.75 | 1.0 | 13.0 | 1,098 | 250–260 | 15–20 | 6 |
| 2a | 7.40 | 38.2 | .85 | 11.3 | 2,545 | 7.40 | 80.95 | .85 | 11.3 | 1,506 | 250–260 | 15–20 | 7 |
| 3a | 4.62 | 50.55 | .53 | 7.05 | 4,790 | 4.62 | 94.80 | .53 | 7.05 | 2,343 | 250–260 | 15–20 | 8 |
| 4a | 2.66 | 54.72 | .31 | 4.06 | 6,540 | 2.66 | 75.77 | .31 | 4.06 | 2,805 | 250–260 | 15–20 | 7¾ |

Example 1a was emulsifiable in water, insoluble in xylene, and insoluble in kerosene; Examples 2a was emulsifiable in water, soluble in xylene but insoluble in kerosene; Example 3a was emulsifiable to insoluble in water, soluble in xylene, and dispersible in kerosene; and Example 4a was emulsifiable to insoluble in water, soluble in xylene and also in kerosene.

In the above table the molecular weight figures are, of course, open to speculation. Since the molecular weight of allyl starch itself is unknown the nearest approach to a molecular weight relationship depends on the glucose unit as a basis of comparison. Needless to say, the allyl ethers represent a somewhat greater molecular weight than the corresponding glucose unit. For purpose of the preceding table I have used a figure for the unit of 222. As is pointed out elsewhere, oxypropylation is a rather complicated procedure, particularly when polyhydric materials are employed, especially in such instances where more than 2 hydroxyls are available per unit or per molecule. In any event, it is to be noted that the initial allyl starch was combined with 25 to 50 times its weight of propylene oxide, based on the assumption of completeness of reaction.

In other series I have added more catalyst and continued to oxypropylate until the molecular weight range was approximately twice that, i. e., a theoretical molecular weight range of 10,000 to 12,000 where the allyl starch represented approximately 1% or slightly more of the final reaction mass. In such instances, however, the hydroxyl molecular weight rose somewhat less, to a maximum of 4,000 to 4,500.

These products were invariably kerosene-soluble as well as being xylene-soluble and insoluble in water.

The final product at the end of the oxypropylation step was amber or pale amber, or of a pale straw color in some instances. This was more or less characteristic of all the various oxypropylation products in the various stages. These products were, of course, slightly alkaline due to the residual caustic soda. The residual basicity due to the catalyst, of course, would be the same if sodium methylate had been used.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weight exceeds 2,000. In some instances the acetyl value or hydroxyl value serves as satisfactorily as an index to the molecular weight as any other procedure, subject to the above limitations, and especially in the higher molecular weight range.

PART 3

As previously pointed out the present invention is concerned with acidic esters obtained from the oxypropylated derivatives described in Part 2, immediately preceding, and polycarboxy acids, particularly tricarboxy acids like citric and dicarboxy acids such as adipic acid, phthalic acid, or anhydride, succinic acid, diglycolic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to DeGroote and Keiser, and particularly with one more opening to permit the use of a porous spreader if hydrochloric acid gas is to be used as a catalyst. Such device or absorption spreader consists of minute Alundum thimbles which are connected to a glass tube. One can add a sulfonic acid such as paratoluene sulfonic acid as a catalyst. There is some objection to this because in some instances there is some evidence that this acid catalyst tends to decompose or rearrange the oxypropylated compounds, and particularly likely to do so if the esterification temperature is too high. In the case of polycarboxy acids such as diglycollic acid, which is strongly acidic there is no need to add any catalyst. The use of hydrochloric acid gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever.

The products obtained in Part 2 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 1 is then diluted further with sufficient xylene, decalin, petroleum solvent, or the like, so that one has obtained approximately a 45% solution. To this solution there is added a polycarboxylated reactant as previously described, such as phthalic anhydride, succinic acid or anhydride, diglycolic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycolic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end-product can be then acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear somewhat viscous amber-colored or pale straw-colored or light amber liquid so obtained may contain a small amount of sodium sulfate or sodium chloride, but, in any event, is perfectly acceptable for esterification in the manner described.

It is to be pointed out that the products here described are not polyesters in the sense that there is a plurality of both allyl starch radicals and acid radicals; the product is characterized by having only one allyl starch radical.

In some instances and, in fact, in many instances I have found that in spite of the dehydration methods employed above that a mere trace of water still comes through and that this mere trace of water certainly interferes with the acetyl or hydroxyl value determination, at least when a number of conventional procedures are used, and may retard esterification, particularly where there is no sulfonic acid or hydrochloric acid present as a catalyst. Therefore, I have preferred to use the following procedure: I have employed about 200 grams of the polyhydroxylated compound as described in Part 2, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of the carboxy reactant and also about 150 grams of a high boiling aromatic petroleum solvent. These solvents are sold by various oil refineries and, as far as solvent effect, act as if they were almost completely aromatic in character. Typical distillation data in the particular type I have employed and found very satisfactory is the following:

I. B. P., 142° C.
5 ml., 200° C.
10 ml., 209° C.
15 ml., 215° C.
20 ml., 216° C.
25 ml., 220° C.
30 ml., 225° C.
35 ml., 230° C.
40 ml., 234° C.
45 ml., 237° C.
50 ml., 242° C.
55 ml., 244° C.
60 ml., 248° C.
65 ml., 252° C.
70 ml., 252° C.
75 ml., 260° C.
80 ml., 264° C.
85 ml., 270° C.
90 ml., 280° C.
95 ml., 307° C.

After this material is added, refluxing is continued, and, of course, is at a high temperature, to wit, about 160° to 170° C. If the carboxy reactant is an anhydride needless to say no water of reaction appears; if the carboxy reactant is an acid water of reaction should appear and should be eliminated at the above reaction temperature. If it is not eliminated I simply separate out another 10 to 20 cc. of benzene by means of the phase-separating trap and thus raise the temperature to 180° or 190° C., or even to 200° C., if need be. My preference is not to go above 200° C. This particular example is illustrative only. Other proportions may be employed.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly by vacuum distillation, then the high-boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

Actually the oxypropylated derivatives of allyl starch or polymerized allyl starch when subjected to esterification with polycarboxy acids show a tendency towards gelation or cross-linking, or at least show a tendency towards a conversion in the direction of hydrophile properties so there is a definite advantage in having present anoxygenated solvent in addition to a hydrocarbon solvent in order to obtain a clear homogeneous solution. This has been referred to previously but reference is made specifically to Table 2 wherein the solvent employed is a mixture of benzene, xylene, diethylene glycol diethylether and methanol. Needless to say, the methanol is not present during the esterification process but is added at the end.

In these experiments the total amount of solvent is indicated. The solvent used represents approximately 65% of diethylether of diethylene glycol and 15% of benzene. Over and above this there was also present the xylene and diphenyl ether which was used as a solvent in the oxypropylation step as described in Part 2, preceding. At the completion of the esterification step in order to obtain a homogeneous solution a small amount of methanol was added. The amount of methanol was usually 5%, 6%, or 7% of the non-hydroxylated solvents previously present.

In subsequent Table 2 reference to amount of solvent is the total solvent, and reference to Diethyl Carbitol is, of course, reference to diethylether or diethylene glycol. These percentages are not critical and may be varied for convenience.

Other solvents could, of course, be substituted as previously pointed out. However, this particular mixture, at least in the subsequent examples, has worked satisfactorily.

The esterification step, as has been pointed out, is conventional and the data are summarized in Tables 2 and 3, following.

TABLE 2

| Ex. No. of Acid Ester | Ex. No. of Oxy. Cmpd. | Theo. M. W. of H. C. | Theo. Hydroxyl V. of H. C. | Actual Hydrox. Value | Mol. Wt. Based on Actual H. V. | Amt. of Hyd. Cmpd. (grs.) | Polycarboxy Reactant | Amt. of Polycarboxy Reactant (grs.) |
|---|---|---|---|---|---|---|---|---|
| 1b | 1a | 1,240 | 135 | 154 | 1,098 | 109.8 | Diglycolic Acid | 40.2 |
| 2b | 1a | 1,240 | 135 | 154 | 1,098 | 109.8 | Oxalic Acid | 37.8 |
| 3b | 1a | 1,240 | 135 | 154 | 1,098 | 109.8 | Aconitic Acid | 52.2 |
| 4b | 1a | 1,240 | 135 | 154 | 1,098 | 109.8 | Adipic Acid | 43.8 |
| 5b | 1a | 1,240 | 135 | 154 | 1,098 | 109.8 | Phthalic Anhyd | 44.4 |
| 6b | 1a | 1,240 | 135 | 154 | 1,098 | 109.8 | Maleic Anhyd | 29.4 |
| 7b | 2a | 2,545 | 66.2 | 112 | 1,506 | 150.6 | Diglycolic Acid | 40.2 |
| 8b | 2a | 2,545 | 66.2 | 112 | 1,506 | 150.6 | Oxalic Acid | 37.8 |
| 9b | 2a | 2,545 | 66.2 | 112 | 1,506 | 150.6 | Aconitic Acid | 52.2 |
| 10b | 2a | 2,545 | 66.2 | 112 | 1,506 | 150.6 | Adipic Acid | 43.8 |
| 11b | 2a | 2,545 | 66.2 | 112 | 1,506 | 150.6 | Phthalic Anhyd | 44.4 |
| 12b | 2a | 2,545 | 66.2 | 112 | 1,506 | 150.6 | Maleic Anhyd | 29.4 |
| 13b | 3a | 4,790 | 35.2 | 71.8 | 2,343 | 117 | Diglycolic Acid | 20.1 |
| 14b | 3a | 4,790 | 35.2 | 71.8 | 2,343 | 117 | Oxalic Acid | 18.9 |
| 15b | 3a | 4,790 | 35.2 | 71.8 | 2,343 | 117 | Aconitic Acid | 26.1 |
| 16b | 3a | 4,790 | 35.2 | 71.8 | 2,343 | 117 | Adipic Acid | 21.9 |
| 17b | 3a | 4,790 | 35.2 | 71.8 | 2,343 | 117 | Phthalic Anhyd | 22.2 |
| 18b | 3a | 4,790 | 35.2 | 71.8 | 2,343 | 117 | Maleic Anhyd | 14.7 |
| 19b | 4a | 6,540 | 25.8 | 60.0 | 2,805 | 140 | Diglycolic Acid | 20.1 |
| 20b | 4a | 6,540 | 25.8 | 60.0 | 2,805 | 140 | Oxalic Acid | 18.9 |
| 21b | 4a | 6,540 | 25.8 | 60.0 | 2,805 | 140 | Aconitic Acid | 26.1 |
| 22b | 4a | 6,540 | 25.8 | 60.0 | 2,805 | 140 | Adipic Acid | 21.9 |
| 23b | 4a | 6,540 | 25.8 | 60.0 | 2,805 | 140 | Phthalic Anhyd | 22.2 |
| 24b | 4a | 6,540 | 25.8 | 60.0 | 2,805 | 140 | Maleic Anhyd | 14.7 |

TABLE 3

| Ex. No. of Acid Ester | Solvent | Amt. Solvent (grs.) | Esterification Temp., °C. | Time of Esterification (hrs.) | Water Out (cc.) |
|---|---|---|---|---|---|
| 1b | Benzene, xylene, Diethyl Carbitol, methanol. | 143.4 | 158 | 7 | 6.6 |
| 2b | ---do--- | 130.2 | 162 | 4½ | 16.4 |
| 3b | ---do--- | 156.4 | 159 | 4½ | 5.6 |
| 4b | ---do--- | 150.6 | 160 | 9½ | 3.0 |
| 5b | ---do--- | 153.7 | 156 | 4½ | 0.5 |
| 6b | ---do--- | 139.2 | 161 | 4½ | ------ |
| 7b | ---do--- | 186.0 | 160 | 4¾ | 5.2 |
| 8b | ---do--- | 172.4 | 175 | 3½ | 16.0 |
| 9b | ---do--- | 197.4 | 172 | 4¾ | 5.4 |
| 10b | ---do--- | 194.4 | 195 | 9¾ | 4.0 |
| 11b | ---do--- | 195.0 | 163 | 5¾ | ------ |
| 12b | ---do--- | 180.0 | 160 | 3¾ | ------ |
| 13b | ---do--- | 134.3 | 166 | 5 | 2.8 |
| 14b | ---do--- | 143.5 | 160 | 2¼ | 8.8 |
| 15b | ---do--- | 148.1 | 155 | 2¼ | 3.0 |
| 16b | ---do--- | 137.5 | 164 | 8 | 1.4 |
| 17b | ---do--- | 139.2 | 160 | 6 | ------ |
| 18b | ---do--- | 131.7 | 162 | 5½ | ------ |
| 19b | ---do--- | 158.3 | 160 | 4 | 2.0 |
| 20b | ---do--- | 151.9 | 155 | 1 | 7.0 |
| 21b | ---do--- | 164.1 | 160 | 1¾ | 2.0 |
| 22b | ---do--- | 160.5 | 200 | 12 | 1.4 |
| 23b | ---do--- | 162.2 | 165 | 4 | ------ |
| 24b | ---do--- | 154.7 | 166 | 3¾ | ------ |

The procedure for manufacturing the esters has been illustrated by preceding examples. If for any reason reaction does not take place in a manner that is acceptable, attention should be directed to the following details: (a) recheck the hydroxyl or acetyl value of the oxypropylated products of the kind specified and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal, as the size of the molecule increases and the reactive hydroxyl radical represents a smaller fraction of the entire molecule more difficulty is involved in obtaining complete esterification.

Even under the most carefully controlled conditions of oxypropylation involving comparatively low temperatures and long time of reaction there are formed certain compounds whose compositions is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value by conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally pale reddish amber to reddish amber in color, and show moderate viscosity. They can be bleached with bleaching clays, filtering chars, and the like. However, for the purpose of demulsification or the like color is not a factor and decolorization is not justified.

In the above instances I have permitted the solvents to remain present in the final reaction mass. In other instances I have followed the same procedure using decalin or a mixture of decalin or benzene in the same manner and ultimately removed all the solvents by vacuum distillation. Appearance of the final products is much the same as the oxypropylated allyl starch before esterification and in some instances were straw, pale amber, or dark amber in color and had a more reddish cast and perhaps were somewhat more viscous.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of cacareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of the product of Example 13b with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 13b, 20%;

A cyclohexylamine salt of a polypropylated naphthalene monosulfonic acid, 24%;

An ammonium salt of a ploypropylated naphthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

PART 5

As pointed out previously, the final product obtained is a fractional ester having free carboxyl radicals. Such product can be used as an intermediate for conversion into other derivatives which are effective for various purposes, such as the breaking of petroleum emulsions of the kind herein described. For instance, such product can be neutralized with an amine so as to increase its water-solubility such as triethanolamine, tripropanolamine, oxyethylated triethanolamine, etc. Similarly, such product can be neutralized with some amine which tends to reduce the water solubility such as cyclohexylamine, benzylamine, decylamine, tetradecylamine, octadecylamine, etc. Furthermore, the residual carboxyl radicals can be esterified with alcohols, such as low molal alcohols, methyl, ethyl, propyl, butyl, etc., and also high molal alcohols, such as octyl, decyl, cyclohexanol, benzyl alcohol, octadecyl alcohol, etc. Such products are also valuable for a variety of purposes due to their modified solubility. This is particularly true where surface-active materials are of value and especially in demulsification of water-in-oil emulsions.

Having thus described my invention, what I claim as new and desire to secure by Letters Patent, is:

1. A process for breaking petroleum emulsions of the water-in-oil type characterized by subjecting the emulsion to the action of a demulsifier including hydrophile synthetic products; said hydrophile synthetic products being acidic fractional esters obtained by reaction between (A) polycarboxy acids and (B) high molal propylation derivatives obtained by the oxypropylation of a member selected from the class consisting of organic solvent-soluble allyl starch and polymerized allyl starch; said oxypropylation involving 5 to 50 parts by weight of propylene oxide per unit weight of the allyl starch derivative; and with the final proviso that the ratio of (A) to (B) be one mole of (A) for each hydroxyl radical present in (B).

2. A process for breaking petroleum emulsions of the water-in-oil type characterized by subjecting the emulsion to the action of a demulsifier including hydrophile synthetic products; said hydrophile synthetic products being acidic fractional esters obtained by reaction between (A) polycarboxy acids and (B) high molal oxypropylation derivatives obtained by the oxypropylation of a member selected from the class consisting of organic solvent-soluble allyl starch and polymerized allyl starch; said oxypropylation involving 5 to 50 parts by weight of propylene oxide per unit weight of the allyl starch derivative; with the added proviso that said allyl starch derivative be xylene-soluble; and with the final proviso that the ratio of (A) to (B) be one mole of (A) for each hydroxyl radical present in (B).

3. A process for breaking petroleum emulsions of the water-in-oil type characterized by subjecting the emulsion to the action of a demulsifier including hydrophile synthetic products; said hydrophile synthetic products being acidic fractional esters obtained by reaction between (A) polycarboxy acids and (B) high molal oxypropylation derivatives obtained by the oxypropylation of a member selected from the class consisting of organic solvent-soluble allyl starch and polymerized allyl starch; said oxypropylation involving 5 to 50 parts by weight of propylene oxide per unit weight of the allyl starch derivative; with the added proviso that said allyl starch derivative be xylene-soluble and water-insoluble; and with the final proviso that the ratio of (A) to (B) be one mole of (A) for each hydroxyl radical present in (B).

4. A process for breaking petroleum emulsions of the water-in-oil type characterized by subjecting the emulsion to the action of a demulsifier including hydrophile synthetic products; said hydrophile synthetic products being acidic fractional esters obtained by reaction between (A) polycarboxy acids and (B) high molal oxypropylation derivatives obtained by the oxypropylation of a member selected from the class consisting of organic solvent-soluble allyl starch and polymerized allyl starch; said oxypropylation involving 5 to 50 parts by weight of propylene oxide per unit weight of the allyl starch derivative; with the added proviso that said allyl starch derivative be xylene-soluble, kerosene-soluble and water-insoluble; and with the final proviso that the ratio of (A) to (B) be one mole of (A) for each hydroxyl radical present in (B).

5. A process for breaking petroleum emulsions of the water-in-oil type characterized by subjecting the emulsion to the action of a demulsifier including hydrophile synthetic products; said hydrophile synthetic products being acidic fractional esters obtained by reaction between (A) dicarboxy acids and (B) high molal oxypropylation derivatives obtained by the oxypropylation of a member selected from the class consisting of organic-solvent soluble allyl starch and polymerized allyl starch; said oxypropylation involving 5 to 50 parts by weight of propylene oxide per unit weight of the allyl starch derivative; with the added proviso that said allyl starch derivative be xylene-soluble, kerosene-soluble and water-insoluble; and with the final proviso that the ratio of (A) to (B) be one mole of (A) for each hydroxyl radical present in (B).

6. A process for breaking petroleum emulsions of the water-in-oil type characterized by subjecting the emulsion to the action of a demulsifier including hydrophile synthetic products; said hydrophile synthetic products being acidic fractional esters obtained by reaction between (A) dicarboxy acids having less than 8 carbon atoms, and (B) high molal oxypropylation derivatives obtained by the oxypropylation of a member selected from the class consisting of organic solvent-soluble allyl starch and polymerized allyl starch; said oxypropylation involving 5 to 50 parts by weight of propylene oxide per unit weight of the allyl starch derivative; with the added proviso that said allyl starch derivative be xylene-soluble, kerosene-soluble and water-insoluble; and with the final proviso that the ratio of (A) to (B) be one mole of (A) for each hydroxyl radical present in (B).

7. The process of claim 6 wherein the dicarboxy acid is phthalic acid.

8. The process of claim 6 wherein the dicarboxy acid is maleic acid.

9. The process of claim 6 wherein the dicarboxy acid is succinic acid.

10. The process of claim 6 wherein the dicarboxy acid is citraconic acid.

11. The process of claim 6 wherein the dicarboxy acid is digylcolic acid.

his
MELVIN X DE GROOTE.
mark

Witnesses to mark:
W. C. ADAMS,
I. S. DE GROOTE.

REFERENCES CITED

The following references are of record in the file of this patent:

UNITED STATES PATENTS

| Number | Name | Date |
|---|---|---|
| 2,307,058 | Moeller | Jan. 5, 1943 |
| 2,562,878 | Blair | Aug. 7, 1951 |
| 2,574,545 | De Groote | Nov. 13, 1951 |